(12) United States Patent
Eromaki

(10) Patent No.: US 10,306,118 B2
(45) Date of Patent: May 28, 2019

(54) APPARATUS, METHOD AND COMPUTER PROGRAM FOR CAPTURING IMAGES

(71) Applicant: Nokia Corporation, Espoo (FI)

(72) Inventor: Marko Eromaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 206 days.

(21) Appl. No.: 13/628,425

(22) Filed: Sep. 27, 2012

(65) Prior Publication Data
US 2014/0085496 A1 Mar. 27, 2014

(51) Int. Cl.
H04N 5/225 (2006.01)
(52) U.S. Cl.
CPC .................. H04N 5/2254 (2013.01)
(58) Field of Classification Search
CPC . H04N 5/2254; H04N 5/2257; H04N 5/23212
See application file for complete search history.

(56) References Cited

U.S. PATENT DOCUMENTS

| 5,930,042 | A | 7/1999 | Miyamoto et al. | 359/557 |
| 6,226,459 | B1 | 5/2001 | Hamada et al. | 396/54 |
| 7,630,618 | B2 | 12/2009 | Nomura | 396/55 |
| 7,881,598 | B1* | 2/2011 | Wu | G03B 17/00 396/133 |
| 2010/0165132 | A1 | 7/2010 | Tokiwa et al. | 348/208.11 |
| 2012/0013754 | A1 | 1/2012 | Lee | 348/208.99 |
| 2012/0120262 | A1* | 5/2012 | Gutierrez | H04N 5/2254 348/207.99 |
| 2012/0120308 | A1* | 5/2012 | Gutierrez | G03B 3/10 348/374 |

FOREIGN PATENT DOCUMENTS

| JP | 2012037549 A | 2/2012 |
| WO | WO-2012039408 A1 | 3/2012 |

OTHER PUBLICATIONS www.optics.org/press/519, "Varioptic Announces Programmable Integrated Optical Image Stabilization and Aub Focus Lens for SmartPhones", (Jan. 26, 2011), (1 page).
http://www.brayebrookobservatory.org/BrayObsWebSite/HOMEPAGE/OIS_M%26M.html, "Optical Image Stabilization—Myths & Misunderstanding", (18 pages).

* cited by examiner

Primary Examiner — Lin Ye
Assistant Examiner — John H. Morehead, III
(74) Attorney, Agent, or Firm — Harrington & Smith

(57) ABSTRACT

An apparatus, method and computer program wherein the apparatus includes an optical arrangement configured to provide an incident light beam to an image sensor; a first actuator mechanism configured to move the optical arrangement relative to the image sensor in a direction perpendicular to the image sensor; a second actuator mechanism configured to move the optical arrangement relative to the image sensor in a direction parallel to the image sensor; and wherein the first and second actuator mechanisms are configured so that actuation of the second actuator mechanism does not cause movement of the first actuator mechanism.

13 Claims, 4 Drawing Sheets

APPARATUS, METHOD AND COMPUTER PROGRAM FOR CAPTURING IMAGES

TECHNOLOGICAL FIELD

Embodiments of the present invention relate to an apparatus, method and computer program for capturing images. In particular, they relate to an apparatus, method and computer program for reducing blurring in captured images.

BACKGROUND

Methods of improving the quality of captured images are known. For example auto focus functions enable the lens of an image capture apparatus such as a camera to be moved relative to the image sensor to focus the image and reduce the amount of blurring.

Similarly it is known to provide image stabilisation systems which enable the lenses to be moved relative to the image sensor to reduce blurring which may be caused by movement of the camera. For example if a user is holding the camera there may be movement due to the users hand shaking which could lead to the blurring of the image.

BRIEF SUMMARY

According to various but not necessarily all embodiments of the disclosure there may be provided an apparatus comprising: an optical arrangement configured to provide an incident light beam to an image sensor; a first actuator mechanism configured to move the optical arrangement relative to the image sensor in a direction perpendicular to the image sensor; a second actuator mechanism configured to move the optical arrangement relative to the image sensor in a direction parallel to the image sensor; and wherein the first and second actuator mechanisms are configured so that actuation of the second actuator mechanism does not cause movement of the first actuator mechanism.

In some embodiments the second actuator mechanism may be coupled to the optical arrangement to cause movement of the optical arrangement. The first actuator mechanism may be coupled to the second actuator mechanism to cause movement of the second actuator mechanism and the optical arrangement.

In some embodiments at least one of the actuator mechanisms may comprise an electromagnetic actuator.

In some embodiments at least one of the actuator mechanisms may comprise a voice coil motor.

In some embodiments the optical arrangement may comprise at least one lens.

In some embodiments the first actuator mechanism may be configured to respond to a control signal to move the optical arrangement relative to the image sensor in a direction perpendicular to the image sensor to enable auto focus of images captured by the image sensor.

In some embodiments the second actuator mechanism may be configured to respond to a control signal to move the optical arrangement relative to the image sensor in a direction parallel to the image sensor to reduce blurring of an image caused by movement of the apparatus.

According to various but not necessarily all embodiments of the disclosure there may be provided a method comprising: providing a first control signal to a first actuator mechanism to control the first actuator mechanism to move an optical arrangement relative to an image sensor in a direction perpendicular to the image sensor; providing a second control signal to a second actuator mechanism to control the second actuator mechanism to move the optical arrangement relative to the image sensor in a direction parallel to the image sensor; wherein the first and second actuator mechanisms are configured so that actuation of the second actuator mechanism does not cause movement of the first actuator mechanism.

In some embodiments the first control signal may cause movement of the optical arrangement relative to the image sensor in a direction perpendicular to the image sensor to enable auto focus of images captured by the image sensor.

In some embodiments the second control signal may cause movement of the optical arrangement relative to the image sensor in a direction parallel to the image sensor to reduce blurring of an image caused by movement of an apparatus.

According to various but not necessarily all embodiments of the disclosure there may be provided a computer program comprising computer program instructions that, when executed by at least one processor, enable an apparatus at least to perform: providing a first control signal to a first actuator mechanism to control the first actuator mechanism to move an optical arrangement relative to an image sensor in a direction perpendicular to the image sensor; providing a second control signal to a second actuator mechanism to control the second actuator mechanism to move the optical arrangement relative to the image sensor in a direction parallel to the image sensor; wherein the first and second actuator mechanisms are configured so that actuation of the second actuator mechanism does not cause movement of the first actuator mechanism.

In some embodiments there may be provided a computer program comprising program instructions for causing a computer to perform any of the methods described above.

In some embodiments there may be provided a physical entity embodying any of the computer programs described above.

In some embodiments there may be provided an electromagnetic carrier signal carrying any of the computer programs described above.

The apparatus may be for capturing images.

BRIEF DESCRIPTION

For a better understanding of various examples of embodiments of the present disclosure reference will now be made by way of example only to the accompanying drawings in which:

FIG. 1 schematically illustrates a cross section through an apparatus according to a first embodiment of the disclosure;

Figure 4:
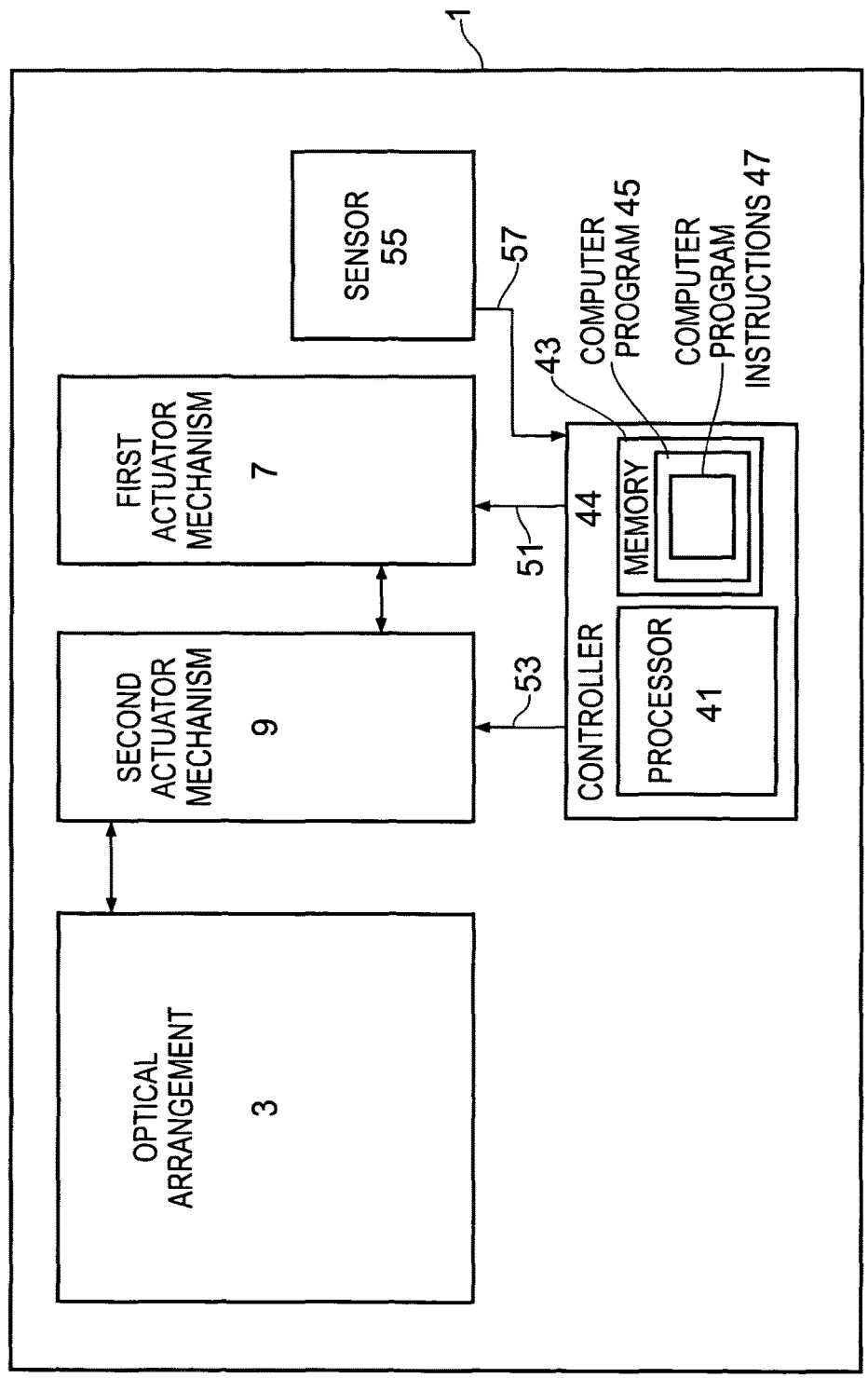

FIG. 4 schematically illustrates another apparatus according to an embodiment of the disclosure.

DETAILED DESCRIPTION

The Figures illustrate an apparatus 1 comprising: an optical arrangement 3 configured to provide an incident light beam to an image sensor 5; a first actuator mechanism 7 configured to move the optical arrangement 3 relative to the image sensor 5 in a direction perpendicular to the image sensor 5; a second actuator mechanism 9 configured to move the optical arrangement 3 relative to the image sensor 5 in a direction parallel to the image sensor 5; and wherein the first and second actuator mechanisms 7, 9 are configured so that actuation of the second actuator mechanism 9 does not cause movement of the first actuator mechanism 7.

Figure 1:
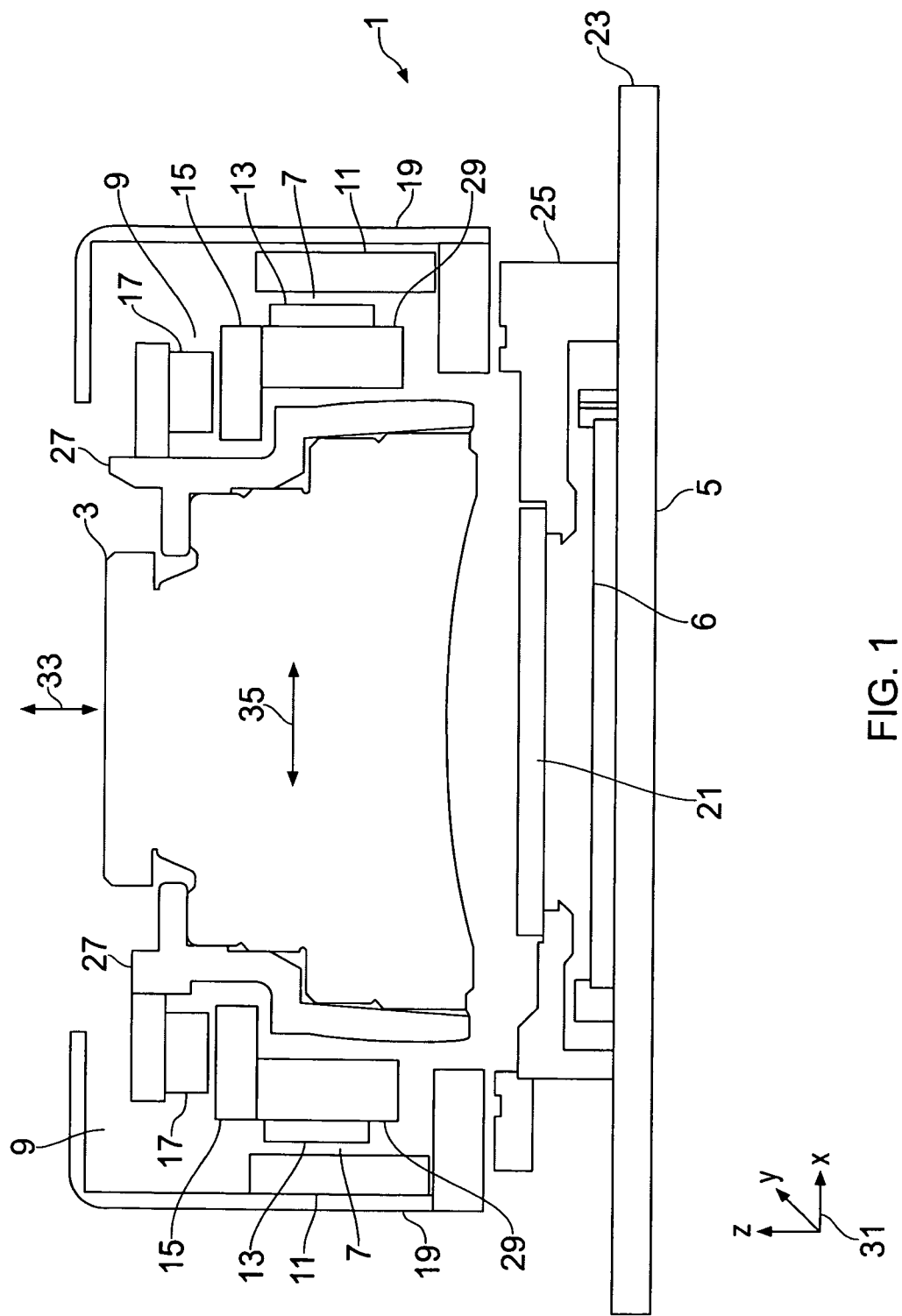

FIG. 1 schematically illustrates a cross section through an apparatus 1 according to a first embodiment of the disclosure. The cross section is taken through the x-z plane as indicated by the axis 31. The apparatus 1 may be an image capture apparatus such as a camera or video camera. It is to be appreciated that the apparatus 1 may comprise other components which have not been illustrated in FIG. 1 or described below.

The components of the apparatus 1 in the following description are operationally coupled. It is to be appreciated that any number or combination of intervening elements may be provided between the respective components of the apparatus 1 including no intervening elements.

The image sensor 5 may comprise any means which may be configured to sense light incident on the sensor 5 and provide an image. In some embodiments the image sensor 5 may comprise any means which is configured to convert light incident on the image sensor 5 into an electrical signal to enable an image to be produced. The image sensor 5 may comprise, for example, a digital image sensor such as a charge-coupled-device (CCD) or a complementary metal-oxide-semiconductor (CMOS) or any other suitable type of sensor.

The image sensor 5 may comprise a surface 6 configured to receive incident light. The surface 6 may be flat or substantially flat. The surface 6 may be arranged to lie in a horizontal plane parallel to the x-y axis as indicated in FIG. 1. The vertical z axis may extend in a direction perpendicular to the surface 6 of the image sensor 5.

In the example embodiment illustrated in FIG. 1 the image sensor 5 is mounted on a substrate 23. The substrate 23 may be for example a printed wiring board. Other electronic components such as a processor for controlling the apparatus 1 may be mounted on the printed wiring board 23.

The example apparatus 1 illustrated in FIG. 1 also comprises a filter element 21 which is positioned overlaying the image sensor 5 so that light incident on the image sensor 5 passes through the filter element 21 before reaching the image sensor 5. The filter element 21 may be, for example, an infra-red filter element which may be transparent to visible light. In the embodiment of FIG. 1 the filter element 21 is mounted on a sensor cover 25.

The optical arrangement 3 may comprise any means configured to focus or deflect incident light onto the image sensor 5. The optical arrangement 3 may receive the incident light from an object or scene external to the apparatus 1 through an aperture in a housing of the apparatus 1. The optical arrangement 3 may comprise, for example, one or more optical devices such as one or more lenses.

In the example of FIG. 1 the optical arrangement 3 is positioned above the image sensor 5 and extends in a vertical direction. The vertical direction may be parallel to the z axis 31.

In the particular example apparatus 1 of FIG. 1 the optical arrangement 3 is contained within a housing 27. The housing 27 may be arranged to protect the optical arrangement 3 and in some embodiments may enable the relative positions of the components within the optical arrangement 3 to be controlled.

The first actuator mechanism 7 is configured to enable the optical arrangement 3 to move in a direction perpendicular to the image sensor 5. For example, the first actuator mechanism 7 may be configured to cause the optical arrangement 3 to be moved along the z axis in a direction perpendicular to the surface 6 of the image sensor 5 as indicated by the arrow 33. The optical arrangement may be moved towards or away from the image sensor 5 as is required.

The first actuator mechanism 7 may be configured to respond to a control signal to move the optical arrangement 3 relative to the image sensor 5 in a direction perpendicular to the image sensor 5 to enable auto focus of images captured by the image sensor 5.

In the particular embodiment illustrated in FIG. 1 the first actuator mechanism 7 comprises an electromagnetic actuator such as a voice coil motor. The first actuator mechanism 7 comprises one or more coils 13 positioned proximate to one or more magnets 11. The respective coils 13 and magnets 11 are arranged so that a change in the electromagnetic field at the coil 13 may cause the magnet 11 to move. The current through the coils 13 may be controlled to control the electromagnetic field of the coil 13 and the subsequent movement of the magnet 11.

In the example embodiment of FIG. 1 two coils 13 and two magnets 11 of the first actuator mechanism 7 are illustrated. A first coil 13 and magnet 11 is provided on a first side of the optical arrangement 3 and a second coil 13 and magnet 11 is provided on the other side of the optical arrangement 3. It is to be appreciated that other coils 13 and magnets 11 may also be provided which are not indicated in the schematic cross section of FIG. 1.

In the example embodiment of FIG. 1 the magnets 11 of the first actuator mechanism 7 are coupled to an external casing 19. The external casing 19 may house the optical arrangement 3 and both the first and second actuator mechanisms 7, 9. The external casing 19 may be configured to house the actuator mechanisms 7, 9. The external casing 19 may act as an electromagnetic shield to protect other components within the apparatus 1 from the magnetic components of the actuator mechanisms 7, 9. The external casing 19 may be a metal casing. The magnets 11 may be arranged so that the coil 13 of the first actuator mechanism 7 moves relative to the external casing 19 but the magnet 11 remains in a fixed position. The external casing 19 may be fixed in position relative to the substrate 23 and the image sensor 5.

The second actuator mechanism 9 is configured to enable the optical arrangement 3 to move in a direction parallel to the image sensor 5. For example, the second actuator mechanism 9 may be configured to enable the optical arrangement 3 to be moved along the x and y axis in a direction parallel to the surface 6 of the image sensor 5. The arrow 35 indicates an example direction of motion which is parallel to the x axis 31. It is to be appreciated that the motion could also extend in the y axis.

The second actuator mechanism 9 may be configured to respond to a control signal to move the optical arrangement 3 relative to the image sensor 5 in a direction parallel to the image sensor 5 to reduce blurring of an image caused by movement of the apparatus 1. The second actuator mechanism may enable image stabilisation of images captured by the image sensors.

In the particular embodiment illustrated in FIG. 1 the second actuator mechanism 9 also comprises an electromagnetic actuator such as a voice coil motor. The second actuator mechanism 9 also comprises one or more coils 17 positioned proximate to one or more magnets 15. So that the current through the coils 17 may be controlled to control the electromagnetic field of the coil 17 and cause the coil 17 to be moved relative to the magnet 15.

In the example embodiment of FIG. 1 two coils 17 and two magnets 15 of the second actuator mechanism 9 are illustrated. A first coil 17 and magnet 15 is provided on a first side of the optical arrangement 3 and a second coil 17 and magnet 15 is provided on the other side of the optical arrangement 3. It is to be appreciated that other coils 17 and magnets 15 may be provided which are not indicated in the schematic cross section of FIG. 1.

In the example embodiment of FIG. 1 the coils 17 and magnets 15 of the second actuator mechanism 9 are arranged in a configuration perpendicular to the coils 13 and magnets 11 of the first actuator mechanism 7. For example, in FIG. 1 the coil 13 of the first actuator mechanism 7 is spaced vertically from the magnet 11 of the first actuator mechanism 7 whereas the coil 17 of the second actuator mechanism 9 is spaced horizontally from the magnet 15 of the second actuator mechanism 9.

In the example embodiment of FIG. 1 the magnets 15 of the second actuator mechanism 9 are coupled to a holder frame 29. The holder frame 29 may hold the second actuator mechanism 9 within the apparatus 1. In an example embodiment the holder frame 29 may be made of plastic. The magnets 15 may be arranged so that the coil 17 of the second actuator mechanism 9 moves relative to the holder frame 29 but the magnet 15 remains in a fixed position.

In the apparatus 1 illustrated in FIG. 1 the second actuator mechanism 9 is coupled to the optical arrangement 3 to cause movement of the optical arrangement 3. The second actuator mechanism 9 may be coupled directly to the housing 27 of the optical arrangement 3. In some embodiments the second actuator mechanism 9 may be coupled indirectly to the housing 27 of the optical arrangement 3 so that there are intervening elements between the second actuator mechanism 9 and the housing 27 of the optical arrangement 3.

The second actuator mechanism 9 may be configured so that when the second actuator mechanism is activated it causes movement of as few components of the apparatus 1 as possible. For example in the embodiment of FIG. 1 the activation of the second actuator mechanism 9 causes movement of the optical arrangement 3, the housing 27 and the coils 15 of the second actuator mechanism 9. The activation of the second actuator mechanism 9 does not cause movement of the first actuator mechanism 7.

Figure 2A:
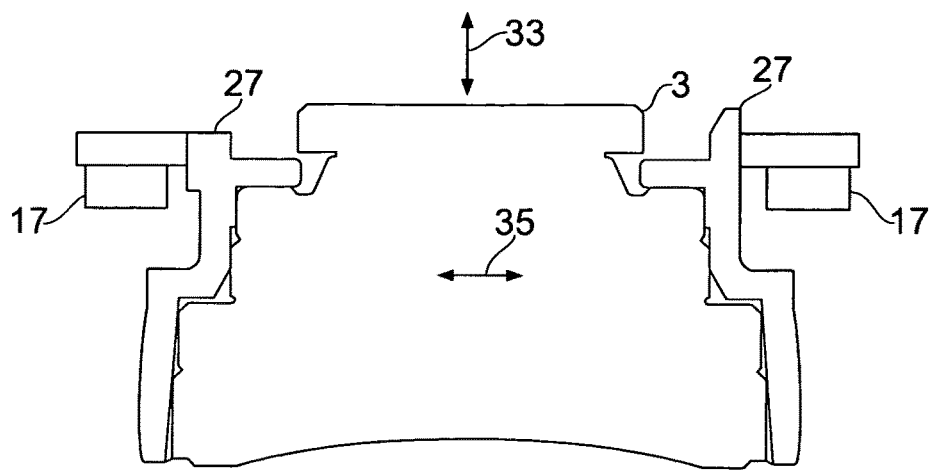
FIGS. 2A and 2B illustrate portions of the apparatus illustrated in FIG. 1.

Also in the example of FIG. 1 the activation of the second actuator mechanism 9 does not cause movement of the magnets 15 of the second actuator mechanism 9. FIG. 2A schematically illustrates the components of the apparatus 1 of FIG. 1 which are moved when the second actuator mechanism 9 is activated.

The magnets 15 may be made of solid metal and so may have a greater mass than the coil 17. Arranging the actuator mechanisms so that the coil moves but the magnet remains fixed may significantly reduce inertia of the system. For example, the mass of the magnets may be significantly higher than the mass of the optical arrangement 3 and other moving elements. In some embodiments the mass of the magnet could be of the order of two to three times the mass of the other moving elements. For example the mass of the optical arrangement 3 may be in a range of 100-150 milligrams and the mass of the magnets may be in a range of 200-300 milligrams.

Figure 2B:
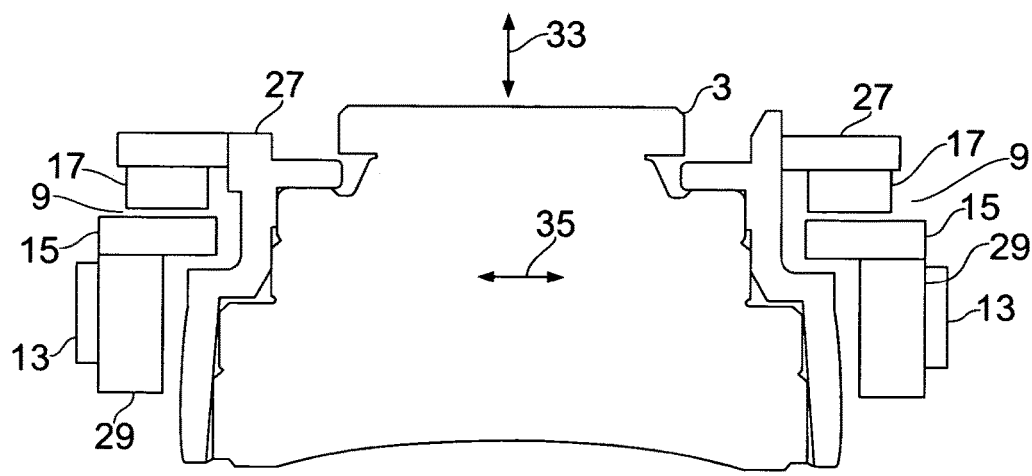

In the example embodiment of FIG. 1 the first actuator mechanism 7 is coupled to the second actuator mechanism 9 so that activation of the first actuator mechanism 7 causes movement of the optical arrangement 3 and the second actuator mechanism 9. For example in FIG. 1 the coil 13 of the first actuator mechanism 7 is coupled to the holder frame 29 which supports the second actuator mechanism 9. When the coil 13 moves this also causes movement of the second actuator mechanism 9 which may include the magnets 15. FIG. 2B schematically illustrates the components of the apparatus 1 of FIG. 1 which are moved when the first actuator mechanism 7 is activated.

Therefore the apparatus 1 of FIG. 1 provides an image capture apparatus in which the first actuator mechanism 7, used for auto focus, is provided outside the second actuator mechanism 9 used for image stabilisation. This results in fewer components of the apparatus 1 being moved when the second actuator mechanism 9 is activated than when the first actuator mechanism 7 is activated. Therefore the second actuator mechanism 9 has a lower inertial mass than the first actuator mechanism 7.

This may enable a more responsive image stabilisation system to be provided. As the mass of the components which are moved when the second actuator system 9 is activated is reduced or minimised the image stabilisation system requires less power to move the optical arrangement 3 and so may be more responsive than the auto-focus system. For example, the image stabilisation system may enable the optical arrangement 3 to be moved more quickly than the auto focus system. In some embodiments the response of the image stabilisation system may be of the order of 0-2 milliseconds. This may enable the image stabilisation system to provide clearer images and be used in situations where a significant amount of vibration of the apparatus 1 may be expected. For example, embodiments of the invention may enable clear images to be obtained even if the user of the apparatus 1 participating in an activity such as walking, running, driving, skating, water-skiing, roller coasting, off-road racing or any other activity. Similarly, embodiments of the disclosure may also allow for clear images to be obtained even if the user is using the camera one handed or for a long exposure time.

Figure 3:
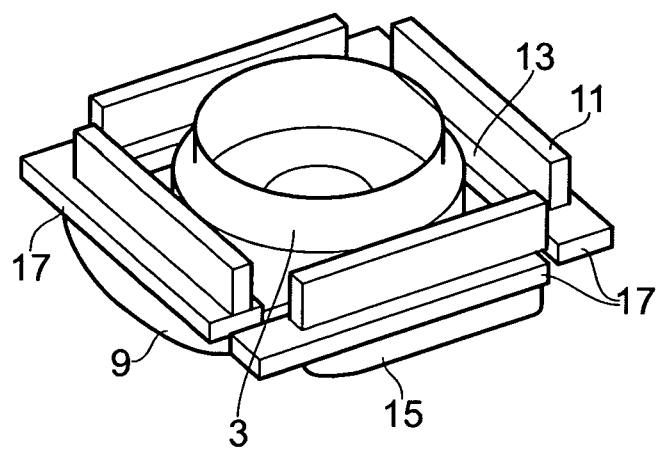
FIG. 3 illustrates a perspective view of a portion of the apparatus.

FIG. 3 illustrates a perspective view of the actuator mechanisms 7, 9 and a portion of the optical arrangement 3 which may be used in some embodiments of the disclosure. In this embodiment the first actuator mechanism 7 comprises four sets of coils 13 and magnets 11 and the second actuator mechanism 9 also comprises four sets of coils 17 and magnets 15. It is to be appreciated that other configurations could be used in other embodiments of the disclosure.

FIG. 4 schematically illustrates an apparatus 1 according to another embodiment of the invention. The apparatus 1 illustrated in FIG. 4 also comprises an optical arrangement 3, a first actuator mechanism 7 and a second actuator mechanism 9. The optical arrangement 3, first actuator mechanism 7 and second actuator mechanism 9 may be as described above in relation to FIG. 1 and so corresponding reference numerals are used.

The apparatus 1 of FIG. 4 further comprises a controller 44 and a sensor 55.

The controller 44 may be configured to send a first control signal 51 to the first actuator mechanism 7 and a second control signal 53 to the second actuator mechanism 9.

The controller 44 may be implemented using instructions that enable hardware functionality, for example, by using executable computer program instructions in a general-purpose or special-purpose processor that may be stored on a computer readable storage medium (disk, memory etc) to be executed by such a processor 41.

The processor 41 may be configured to read from and write to the memory 43. The processor 41 may also comprise an output interface via which data and/or commands are output by the processor 41 and an input interface via which data and/or commands are input to the processor 41.

The memory 43 may be configured to store a computer program 45 comprising computer program instructions 47 that control the operation of the apparatus 1 when loaded into the processor 41. The computer program instructions 47 provide the logic and routines that enables the apparatus to perform the described above. The processor 41 by reading the memory 43 is able to load and execute the computer program 45.

The apparatus 1 therefore comprises: at least one processor 41; and at least one memory 45 including computer program instructions 47 the at least one memory 43 and the computer program instructions 47 configured to, with the at least one processor 41, cause the apparatus 1 at least to perform: providing a first control signal 51 to a first actuator mechanism 7 to control the first actuator mechanism 7 to move an optical arrangement 3 relative to an image sensor 5 in a direction perpendicular to the image sensor 5; providing a second control signal 53 to a second actuator mechanism 9 to control the second actuator mechanism 9 to move the optical arrangement 3 relative to the image sensor 5 in a direction parallel to the image sensor 5; wherein the first and second actuator mechanisms 7, 9 are configured so that actuation of the second actuator mechanism 9 does not cause movement of the first actuator mechanism 7.

The controller 44 therefore may be configured to provide the first control signal 51 to the first actuator mechanism 7 to control the movement of the optical arrangement 3 in a vertical direction. The vertical movement of the optical arrangement 3 may enable auto-focus of images captured by the image sensor 5. The first control signals 51 may be provided in response to any suitable input, for example, a detection that an object to be imaged is a predetermined distance from the apparatus 1 or any other suitable input.

The controller 44 may also be configured to provide the second control signal 53 to the second actuator mechanism 9 to control the movement of the optical arrangement 3 in a horizontal direction. The horizontal movement of the optical arrangement 3 may enable image stabilisation of images captured by the image sensor 5. The second control signal 53 may be provided in response to any suitable input, for example, a detection of movement of the apparatus 1.

The computer program may arrive at the apparatus 1 via any suitable delivery mechanism 61. The delivery mechanism 61 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 45. The delivery mechanism may be a signal configured to reliably transfer the computer program 45. The apparatus 1 may propagate or transmit the computer program 45 as a computer data signal.

Although the memory 43 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

The sensor 55 may comprise any means which may be configured to detect a change in angular position of the apparatus 1. The sensor 55 may be configured to detect changes in pitch and yaw of the apparatus 1. The sensor 55 may be configured to detect the vibrations or other movement of the apparatus 1.

The sensor 55 may comprise any suitable means such as a gyroscopic element or any other type of sensor.

The sensor 55 may be configured to provide a third control signal 57 to the controller 44. The third control signal 57 may provide an indication of the detected change in angular position of the apparatus 1. The control signal 57 may cause the controller to provide the second control signal 53 to the second actuator system to control the movement of the optical arrangement 3 to the required position.

It is to be appreciated that other sensors could be provided, for example, there may also be provided a sensor or other means configured to determine whether or not images are in focus and cause the controller 44 to move the auto-focus system accordingly.

The apparatus 1 described above may be provided in an image providing apparatus such as a camera or video camera. In some embodiments the apparatus 1 may be integrated within an apparatus such as a mobile phone or tablet computer or other suitable device.

In the above described embodiments the z direction is direction is described as being horizontal and the x and y directions are described as being vertical. It is to be appreciated that this terminology has been used to make the description clear relative to the figures and that the apparatus 1 may be used in any orientation.

Although embodiments of the present invention have been described in the preceding paragraphs with reference to various examples, it should be appreciated that modifications to the examples given can be made without departing from the scope of the invention as claimed. For example in the above described embodiments the actuator mechanisms are configured to move the optical arrangement. It is to be appreciated that in other embodiments the actuator mechanisms may be configured to move the image sensor.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   an optical arrangement configured to provide an incident light beam to an image sensor;
   a first actuator mechanism comprising a first magnet and a first coil, the first actuator mechanism configured to move the optical arrangement relative to the image sensor in a direction perpendicular to the image sensor;
   a second actuator mechanism comprising a second magnet and a second coil, the second actuator mechanism configured to move the optical arrangement relative to the image sensor in a direction parallel to the image sensor; and
   wherein when movement of the second magnet relative to the second coil occurs, the first magnet and the first coil remain in a fixed position relative to the image sensor such that the first magnet and the first coil do not move with the movement of the second coil.

2. An apparatus as claimed in claim 1 wherein the second actuator mechanism is coupled to the optical arrangement to cause movement of the optical arrangement.

3. An apparatus as claimed in claim 2 wherein the first actuator mechanism is coupled to the second actuator mechanism to cause movement of the second actuator mechanism and the optical arrangement.

4. An apparatus as claimed in claim 1 wherein at least one of the actuator mechanisms comprises an electromagnetic actuator.

5. An apparatus as claimed in claim 1 wherein at least one of the actuator mechanisms comprise a voice coil motor.

6. An apparatus as claimed in claim 1 wherein the optical arrangement comprises at least one lens.

7. An apparatus as claimed in claim 1 wherein the first actuator mechanism is configured to respond to a control signal to move the optical arrangement relative to the image sensor in a direction perpendicular to the image sensor to enable auto focus of images captured by the image sensor.

8. An apparatus as claimed in claim 1 wherein the second actuator mechanism is configured to respond to a control signal to move the optical arrangement relative to the image sensor in a direction parallel to the image sensor to reduce blurring of an image caused by movement of the apparatus.

9. A method comprising:
   providing a first control signal to a first actuator mechanism comprising a first magnet and a first coil to control the first actuator mechanism to move an optical arrangement relative to an image sensor in a direction perpendicular to the image sensor;
   providing a second control signal to a second actuator mechanism comprising a second magnet and a second coil to control the second actuator mechanism to move the optical arrangement relative to the image sensor in a direction parallel to the image sensor;
   wherein when movement of the second magnet relative to the second coil occurs, the first magnet and the first coil remain in a fixed position relative to the image sensor such that the first magnet and the first coil do not move with the movement of the second coil.

10. A method as claimed in claim 9 wherein the first control signal causes movement of the optical arrangement relative to the image sensor in a direction perpendicular to the image sensor to enable auto focus of images captured by the image sensor.

11. A method as claimed in claim 9 wherein the second control signal causes movement of the optical arrangement relative to the image sensor in a direction parallel to the image sensor to reduce blurring of an image caused by movement of an apparatus.

12. A non-transitory computer-readable storage medium embodying a computer program comprising computer program instructions that, when executed by at least one processor, enable an apparatus at least to perform:
   providing a first control signal to a first actuator mechanism comprising a first magnet and a first coil to control the first actuator mechanism to move an optical arrangement relative to an image sensor in a direction perpendicular to the image sensor;
   providing a second control signal to a second actuator mechanism comprising a second magnet and a second coil to control the second actuator mechanism to move the optical arrangement relative to the image sensor in a direction parallel to the image sensor;
   wherein when movement of the second magnet relative to the second coil occurs, the first magnet and the first coil remain in a fixed position relative to the image sensor such that the first magnet and the first coil do not move with the movement of the second coil.

13. A non-transitory computer-readable storage medium embodying a computer program comprising program instructions for causing a computer to perform the method of claim 9.

* * * * *